United States Patent [19]
Taylor

[11] 3,868,492
[45] Feb. 25, 1975

[54] HEATED WINDOWS IN ROAD VEHICLES

[75] Inventor: John Crawshaw Taylor, Buxton, England

[73] Assignee: Tarka Controls Ltd., Derbyshire, England

[22] Filed: May 15, 1973

[21] Appl. No.: 360,434

[30] Foreign Application Priority Data
May 18, 1972 Great Britain .................... 23541/72
Feb. 6, 1973 Great Britain ..................... 5736/73

[52] U.S. Cl. ............... 219/203, 15/250.05, 52/171, 73/336.5, 219/522, 219/547, 338/35, 340/234
[51] Int. Cl. ........ H05b 1/02, E06b 7/12, H05b 3/06
[58] Field of Search ........... 219/522, 203, 202, 489, 219/547, 200, 543; 338/35; 340/234, 235; 52/171; 318/483; 73/336.5; 200/61.05; 15/250.12, 250.05

[56] References Cited
UNITED STATES PATENTS

| | | | |
|---|---|---|---|
| 3,164,820 | 1/1965 | Hulett ................................ | 340/234 |
| 3,282,097 | 11/1966 | Schmid et al. ............... | 219/200 UX |
| 3,408,477 | 10/1968 | Kolster................................ | 340/234 X |
| 3,412,326 | 11/1968 | Jones et al. ..................... | 340/234 X |
| 3,696,360 | 10/1972 | Gajewski............................. | 340/235 |
| 3,749,885 | 7/1973 | Nagasima............................ | 219/522 |

FOREIGN PATENTS OR APPLICATIONS

| | | | |
|---|---|---|---|
| 727,020 | 3/1955 | Great Britain ...................... | 219/522 |
| 884,967 | 12/1961 | Great Britain ...................... | 219/203 |

Primary Examiner—A. Bartis
Attorney, Agent, or Firm—Bacon & Thomas

[57] ABSTRACT

An electrically heated window in a road vehicle provided with sensing electrodes on the window for detecting the formation of condensation and an electronic switching circuit responsive to the sensing electrodes for energising the window heater when condensation formation is sensed. For optimum efficiency one of the sensing electrodes is spaced from the heater conductors by a distance of the order of half the distance between adjacent heater conductors, and for obtaining differential sensitivity to condensation formation in different areas of the window the sensing electrodes are differentially spaced from one another.

7 Claims, 7 Drawing Figures

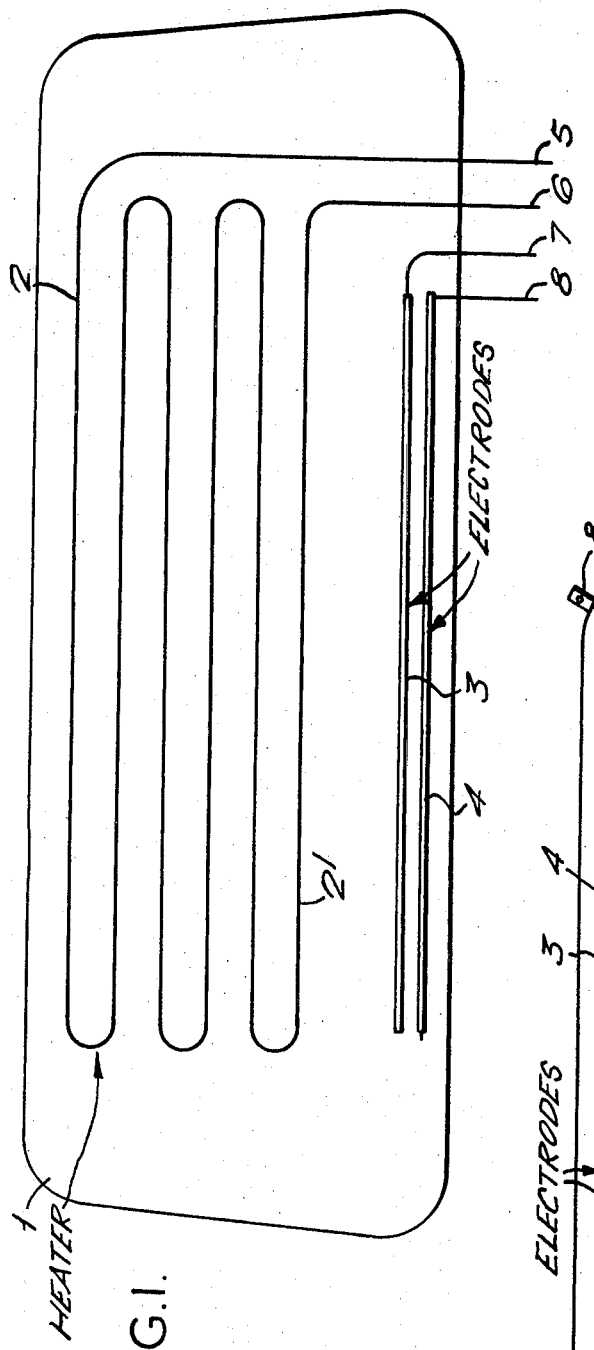
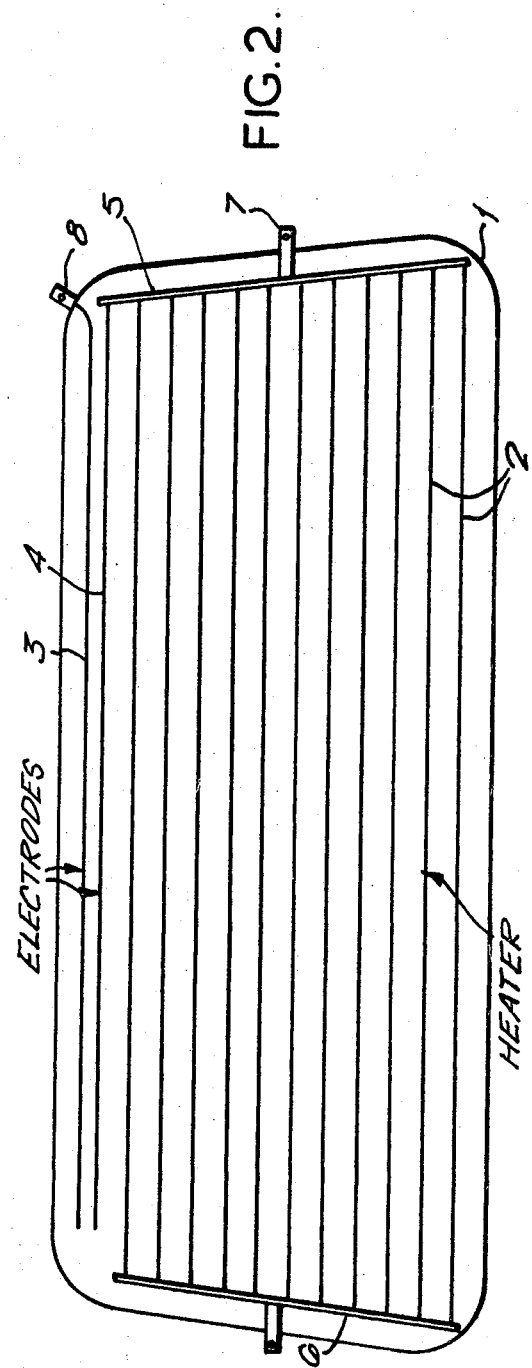

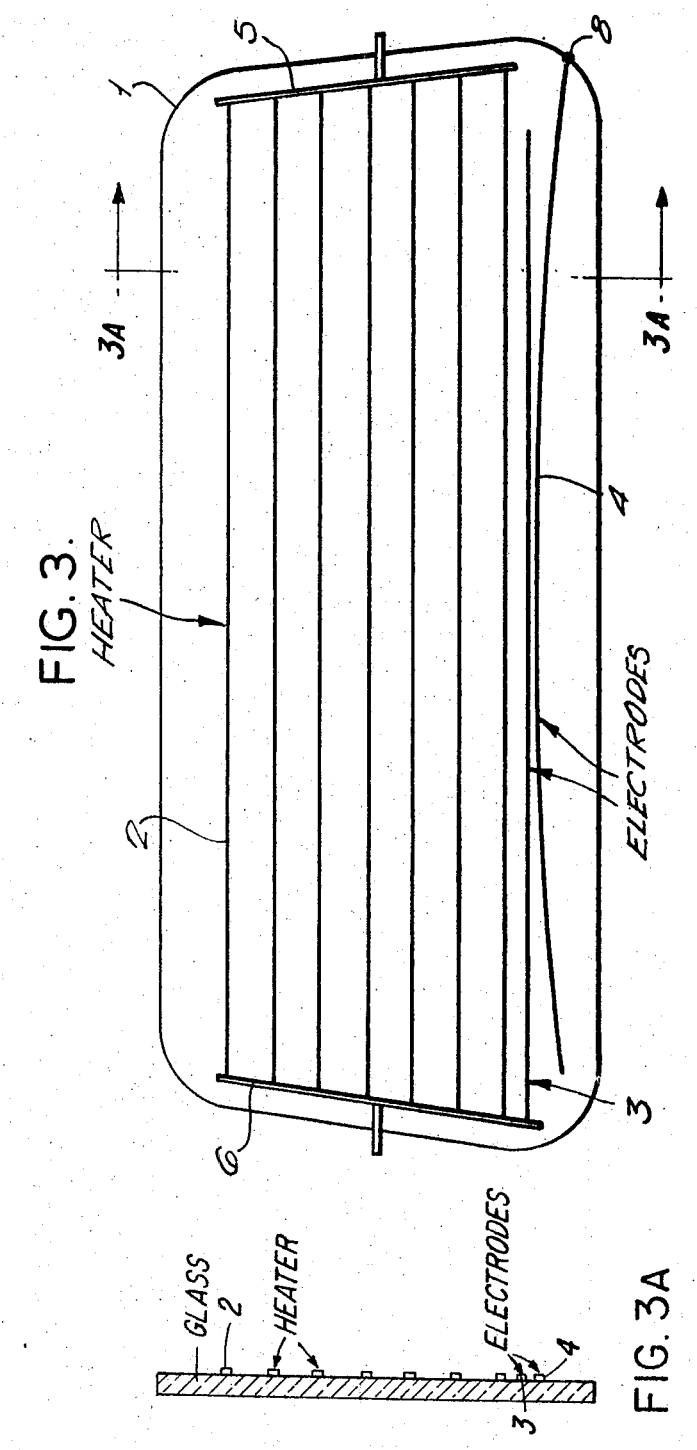

HEATED WINDOWS IN ROAD VEHICLES

This invention concerns improvements in heating control and in particular relates to the control of heaters for removing vision-obscuring condensation from windows of road vehicles.

The necessity of a heated rear window in an automobile is gaining wider recognition and more and more automobile manufacturers are providing heated rear windows as a standard fitting, an electric heating element generally being either embedded in or mounted on the interior surface of the vehicle rear screen and the heating element being powered from the vehicle battery either continuously so long as the vehicle ignition is switched on or intermittently as desired by operation of a manual control switch. It has been recognised that the continuously energised heating element and the inadvertently not-switched-off manually controlled heating element constitute a serious and unnecessary drain upon the vehicle battery which already is required to accommodate increasing power demands from electrically-operated components of the vehicle such as windscreen wipers, screen washers, vehicle lighting and trafficators, heating and cooling fan motors, car radios and record/tape players, etc. all of which contribute to a substantial power demand. To avoid this problem and yet retain the facility of a heated rear window, it has already been proposed to provide a manually operable control which will automatically switch off the window heating element a predetermined period after it has been manually switched on. While such a delayed switch-off automatic control is advantageous in that it ensures that the heater is switched off once condensation is cleared from the window to the driver's satisfaction, the preselection of the on period is necessarily arbitrary and the duration of the on period may not suit all conditions without being unduly long so that the heater element again constitutes an undesirably high drain upon the battery.

Another disadvantage of the previous demister arrangements other than those of the continuously powered type is that they require the visual stimulus of a misted-up window to initiate the manual switch-on of the demister and there is then a time lag before the window clears; i.e., the known arrangements only operate to clear a window after condensation has formed thereupon to such an extent as to be visually noticeable.

The object of this invention is to overcome or at least substantially reduce the abovementioned disadvantages, and in order to achieve this object the invention proposes to sense automatically the condensation of moisture upon the vehicle window and, in dependence thereupon, to control the energisation of the heater element so that it is powered for so long as the amount of condensation upon the window exceeds a predetermined level.

According to this invention therefore, there is provided in a road vehicle an arrangement for reducing condensation upon the interior surface of a window of the vehicle, the said arrangement including spaced electrodes arranged so as to be bridged resistively by condensation upon said surface, a solid state electronic switching circuit responsive to the resistance between said electrodes, and a heating element responsive to the condition of said electronic switching circuit for heating said surface, the arrangement being such that in operation the switching circuit is in a condition for energising the heating element for so long as the resistance between said electrodes is lower than that characterizing a predetermined degree of condensation upon said surface.

It will be appreciated that the resistance between the electrodes is strongly dependent upon the degree of condensation upon the window; when the window is clear of condensed moisture, the resistance may typically be in the megohm range depending upon the spacing of the electrodes, whereas, when the electrodes are effectively bridged by a film of condensed moisture, the resistance therebetween will be significantly reduced. The present invention takes advantage of this resistance change, or in other words the change in the surface conductivity of the window, which can readily be sensed to control the operation of the heater element. Depending upon the sensitivity of the switching circuit to resistance change between the sensing electrodes, which sensitivity can be selected to be as high as is reasonably desirable, it can be arranged that in operation of the arrangement according to the invention a degree of condensation less than that which would be noticeable visually is sufficient to operate the heater element. In this respect, the invention can be arranged to prevent condensation from forming upon the vehicle window to a noticeable degree, whereas the prior art arrangements, other than that wherein the heater is continuously energised, operate on the basis of enabling removal of condensation after it has formed to a noticeable extent rather than preventing such formation.

I am aware of British Pat. No. 884,947 (Minister of Aviation, London) which discloses and claims a vehicle windscreen, or other transparent body of electrically non-conductive material or of a material of high electrical resistance, provided upon its surface with electrodes connected to means responsive to changes of electrical resistance and associated with and arranged to control the operation of means to prevent or reduce misting of the said surface when this tends to take place as a result of conductive deposits such as would be produced by condensation of water vapour thereon. However, whereas the present invention is specifically concerned with the removal of condensation from the windows of road vehicles (particularly, though not exclusively, automobiles) and is designed and intended for operation within the restrictions imposed by the commonly limited power supply of a road vehicle, the arrangement of British Pat. No. 884,967 is not so concerned, designed and intended and in fact utilizes vacuum tube circuitry and has power supply requirements (exemplified as a 24-volt motor generator or a transformer rectifier power pack) not available in a road vehicle.

The arrangement according to the invention may be such that whereas the switching-on of the heater element is controlled in direct dependence upon the resistance between the electrodes, the switching-off is controlled for example by a timing mechanism adapted to provide a relatively short heating period (e.g. several minutes) once the heater has been switched on and which will be reset if at the end of one such period the resistance between the electrodes still remains below that characterizing an acceptably clear window. Alternatively and preferably the arrangement may be such that both the switching-on and the switching-off of the heater element is controlled by said electronic switching circuit in direct dependence upon the resistance between the electrodes, the arrangement then being such that the heating element will be energised only for so long as the resistance between said electrodes is lower than that characterizing said predetermined degree of condensation; this latter arrangement ensures the minimum consumption of power by the heating element which is consistent with maintaining the window acceptably clear.

While the heater element in an arrangement according to this invention can be of any convenient type, i.e., a fine wire heating element embedded in the window or alternatively an external element mounted on or adjacent to the surface of the window could be used, it is preferred to employ a surface mounted heating element since such as element can be formed on the window surface in a single operation, advantageously together with the sensing electrodes, for example by a printing or other material deposition technique. A heating element and electrodes formed by a "printed circuit" technique are particularly convenient. The sensing electrodes could consist of a pair of spaced spot electrodes, although a more useful arrangement is obtained with extended linear electrodes which would be operable for example if condensation were to form on one side only of a vehicle rear screen whereas the spot electrode arrangement would not operate if no condensation formed in the location of the spots. One of the sensing electrodes could be constituted by a bus rail of the heater element thereby reducing the number of terminal attachments required so long as the bus rail was itself sufficiently substantial not be appreciably heated when the heater element is energised. It is possible that one of the sensing electrodes could be constituted by the chassis of the vehicle itself, which would require only one electrode actually on the window; however such an arrangement of the electrodes is not preferred.

In one exemplary form of heating element and electrode arrangement hereinafter described, the heating element is a convoluted electrical resistance heater printed upon the surface of the rear window of a vehicle. The principal parts of the conductors constituting the resistance heater extend horizontally relative to the normal attitude of the vehicle. The sensing electrodes for detecting condensation upon the window surface are constituted by two parallel spaced linear electrodes affixed to the window surface some distance below the heating element. In another exemplary arrangement, the heating element is again consituted by resistive heating elements which extend parallel to one another horizontally across the window surface between two heater bus-bars which extend substantially vertically one at each side of the window. In this arrangement, the sensing electrodes are constituted by electrical conductors extending parallel to the heater conductors and disposed towards the top edge of the window. It will be noted that in these two arrangements the sensing electrodes are spaced from the heater conductors by a distance at least equal to the spacing of the heater conductors from one another.

I have found that with the abovementioned two arrangements, which otherwise are practicable, the dispositions of the heating elements relative to the sensing electrodes is not efficient in that it causes the heater to be energised for longer than is required for the purpose of ensuring clarity of vision through the window. Another aspect of this invention aims to improve the efficiency of the electrode and heater arrangement.

According to this further aspect of the invention, a more efficient arrangement is obtained with a heater in the form of equally spaced parallel electrical resistance heating elements if at least one of the sensing electrodes extends parallel to the heating elements outside of the area encompassed thereby and is spaced from the nearest adjacent heating element by a distance of the order of half the spacing of the heating elements from one another.

At optimum operating efficiency, each heating element when optimally powered is capable within a predetermined time of clearing a predetermined degree of condensation from a window surface band of predetermined width centred upon the respective heating element. The optimum arrangement of the heater has the heating elements spaced apart a distance equal to the width of the said band, and the optimum arrangement of the sensing electrodes in regard to minimising the period of energisation of the heater is with the nearest of the sensing electrodes spaced from the adjacent heating element by a distance equal to half the width of the said band. Any greater spacing of the sensing electrode from the adjacent heating element may result in the sensing electrode being in an area of condensation even after the heater has removed all condensation from the area encompassed by the heating elements. Any lesser spacing of the sensing electrodes from the adjacent heating element may result in the sensing electrode being in a condensation-free area before the heater has removed all condensation from the area encompassed by the heating elements.

In practice, the degree of condensation upon a window surface does not substantially influence the pattern of development of the condensation-free bands which form progressively while the heating elements are energised. There is thus an optimum sensing element position which is substantially independent of the degree of condensation and this can be determined experimentally without difficulty.

In accordance with a further refinement, the spacing between the two sensing electrodes is different at different points along their length so as to provide a differential sensitivity to condensation on different areas of the window. Clearly a higher degree of condensation can be tolerated around the edges of a vehicle window than could be tolerated on the central window area. With the sensing electrodes arranged so that the spacing therebetween is least in a central region of the window and increases towards the edges of the window, an arrangement is obtained with high sensitivity to condensation in the most important central window area and lower sensitivity around the edges of the window.

Any suitable electronic switching circuit capable of responding to a significant change in the resistance between the sensing electrodes can be used. As a switching device for controlling the supply of power to the heating element, the circuit could for example incorporate a relay switch or alternatively might incorporate a suitably highly rated electronic switching device.

In order that this invention might be understood more clearly several embodiments thereof will now be described by way of example only with reference to the accompanying drawings wherein:

FIG. 1 shows an automobile rear window provided with an arrangement of a heater element and a pair of sensing electrodes;

FIG. 2 shows an alternative arrangement of a heater element and a pair of sensing electrodes provided on an automobile rear window;

FIG. 3 shows a further, preferred arrangement of a heater element and sensing electrodes provided on an automobile rear window;

FIG. 3A is a sectional view taken on the line 3A—3A of FIG. 3;

Figure 4:
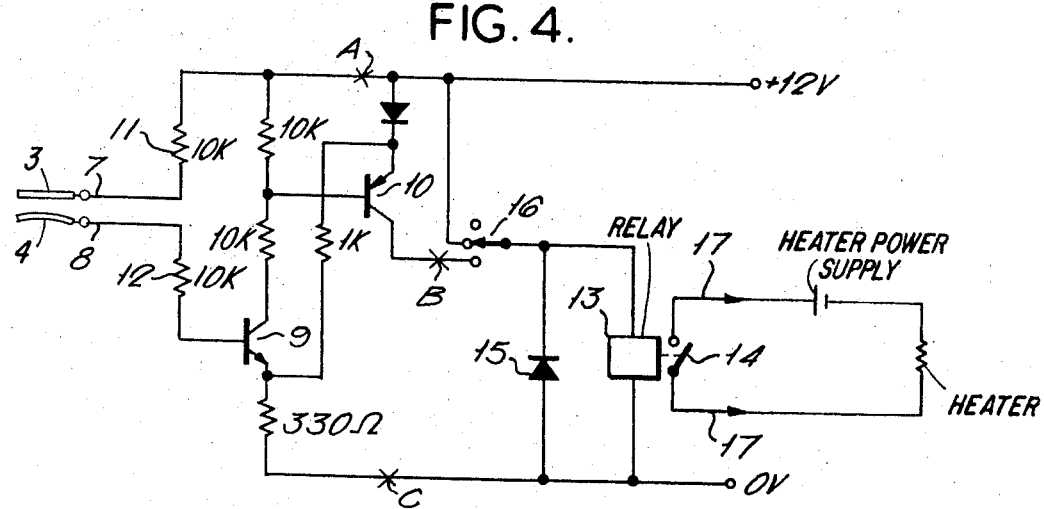
FIG. 4 shows a circuit diagram illustrating one form of switching circuit suitable for an arrangement according to the invention.

Refering to the drawings, FIG. 1 shows a rear window 1 having printed thereon a convoluted electrical resistance heater 2, and two parallel spaced sensing electrodes 3 and 4. Electrical connection to the heater 2 and electrodes 3 and 4 is made via terminal wires 5 to 8.

In the arrangement of FIG. 1, there are four terminal wires 5 to 8 which provide for connection to the electrodes 3 and 4 and the heater 2. It is advantageous to reduce the number of wires which are required for interconnection purposes, and this could be achieved in the arrangement of FIG. 1 by using as one of the electrodes 3 and 4 the adjacent parallel line 2' constituting part of the heater 2 so long as the line 2' was made more substantial so as not to heat up when the heater 2 was switched on, since if this were to happen condensation would be evaporated quickly from the window adjacent to the line 2' thereby raising the resistance between the two electrodes and causing the heater 2 to be switched off before the window was fully clear of condensation.

FIG. 2 shows an alternative arrangement which requires only three terminal wires. Referring to FIG. 2 a window 1 has printed thereon two condensation-sensing electrodes 3 and 4, two heater bus-bars 5 and 6 and several parallel heater wires 2 extending between the busses 5 and 6. A terminal 7 is provided for making connection to bus 5 and sensing electrode 4 connected thereto, and a terminal 8 connects with sensing electrode 3. A further terminal connects with bus 6. The electrode 4 is connected at one end to the bus-bar 5, and the heater wires 2 extend between the two bus-bars 5 and 6. As will be appreciated, the heater current does not flow through the electrode 4 so that there is no risk of self-heating in electrode 4. It will also be noted that, in the arrangement of FIG. 2, the sensing electrodes are disposed towards the top edge of the window; since condensation evaporated from the window may rise and tend to re-condense in the region of the electrodes where the window is unheated, this disposition of the electrodes ensures that the heater is not switched off until the window is fully cleared of condensation.

In the arrangements of the condensation-sensing electrodes just described, the situation may arise that, if the heating element extends over only part of the window surface, for example only over a central area thereof, condensation may be present to resistively bridge the sensing electrodes in a region remote from the heating element even though in the region of the heating element the window surface may be completely clear of condensation and vision may not be obscured. This situation results in the heating element being unnecessarily energized. This disadvantage may be avoided by so arranging the sensing electrodes on the window surface that they are only in sufficiently close proximity to each other to be resistively bridged by condensation in the region of the heating element; one such arrangement has the two sensing electrodes in the form of linear conductors which extend towards one another from opposite sides of the window and overlap for resistive bridging by condensation only in a central area of the window which central area carries the heating element.

In the arrangement shown in FIG. 3 of the accompanying drawings the heater consists of a number of spaced parallel resistance heating elements 2 extending between two heater bus-bars 5 and 6. The sensing electrodes are constituted by a first rectilinear electrode 3 extending from one of the heater bus-bars but not connected to the other heater bus-bar and a second curved sensing electrode 4 which connects to a terminal 8.

As will be seen from the drawing, the sensing electrode 3 is spaced from the nearest adjacent heating element 2 by a distance equal to one half of the spacing between one heating element 2 and the next adjacent heating element. It will be appreciated that in operation each heating element 2 will clear a band of condensation centred upon itself, the width of the cleared band obviously depending upon the period of energisation of the heater. With the heating elements 2 spaced apart such a distance that the band cleared by one heating element will meet the band cleared by the next adjacent heating element within a predetermined time period for a predetermined degree of condensation and with the heater power predetermined, the arrangement of the sensing electrode 3 is such that it is cleared of condensation at the same time as the window area encompassed by the heating elements 2 is cleared. Any further spacing of the sensing electrode 3 from the nearest adjacent heating element 2 would cause the heater to be energised even after the condensation had been cleared from the area encompassed by the heating elements.

The accompanying drawing also illustrates the differential spacing of the two sensing electrodes 3 and 4 from one another. It can be seen that the spacing is least in the region of the centre of the vehicle window and is greatest at the edges of the window. By virtue of such an arrangement, the sensitivity to condensation is highest in the most important central region of the window and decreases towards the edges. Such an arrangement is useful where a degree of condensation around the edges of the window can be tolerated so long as the central window area is condensation free.

FIG. 4 shows one form of switching circuit which may be used to control the power supplied to the heaters in the arrangements of FIGS. 1 to 3. The circuit can be regarded as consisting of two parts, a solid state sensing and amplifying circuit which is shown to the left of the points A, B, and C in FIG. 4, and an output switching stage which is shown to the right of the points A, B, and C. Both parts of the circuit receive power from a 12 volt supply, which may be the motor car battery.

The sensing and amplifying circuit shown in FIG. 3 includes an N P N transistor 9 and a P N P transistor 10 in a direct coupled amplifier arrangement. Base current is supplied to the base of the transistor 9 from the positive supply line via a resistor 11, the conductor or terminal 7, the resistance between the sensing electrodes 3 and 4, the conductor or terminal 8, and a resistor 12.

The switching stage shown in FIG. 4 consists of a high resistance (e.g. 110Ω) relay coil 13 having a single normally open contact 14, a diode 15 connected with the polarity shown in parallel with the relay coil 13, and a single-pole three-way switch 16. The relay contact 14 is connected via leads 17 in a series circuit which includes the heater 2 and the power supply for the heater. The switch 16 enables the power supply to the relay coil 13, and hence the power supply to the heater 2, to be permanently switched off, permanently switched on, or automatically switched on and off by the sensing and amplifying circuit. If the power supplied to the heater is only required to be automatically controlled the switch 16 may be omitted, the point B being connected to the relay 13.

The circuit arrangement of FIG. 4, in conjunction with the sensing electrodes 3 and 4 shown in FIGS. 1 to 3, operates as described below.

When the window 1 is completely clear of condensation, the resistance between the electrodes 3 and 4 is very high, typically of the order of several megohms. The resultant base current of the transistor 9 is insufficient to cause this transistor, and hence the transistor 10, to conduct. Accordingly the current which flows through the relay coil 13, when the switch 16 connects the coil 13 to the point B, is insufficient to cause the contact 14 to close, and no power is supplied to the heater 2.

As soon as there is a trace (which need not necessarily be visible) of condensation or mist on the window 1, the resistance between the electrodes 3 and 4 falls to a much lower value, and the transistor 9 receives a greatly increased base current. Transistor 9 conducts, causing the transistor 10 to conduct and, when the switch 16 connects the coil 13 to the point B, current flows through the relay coil 13 causing the contact 14 to be closed. Power is then supplied to the heater 2 until the window 1 is cleared of mist, when the increased resistance between electrodes 3 and 4 causes transistors 9 and 10 to cease to conduct whereupon current ceases to flow through the relay coil 13 and the contact 14 opens. The diode 15 is provided to prevent transient voltages, generated in the relay coil 13 when the transistor 10 ceases to conduct, from being applied to the transistor 10 and possibly damaging this transistor.

Figure 5:
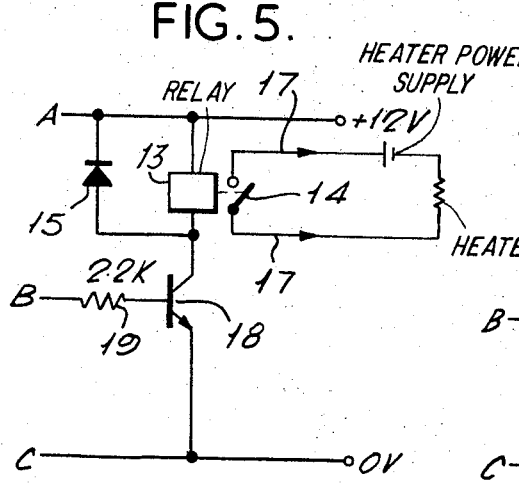
FIGS. 5 and 6 shows modifications which may be made to the switching circuit shown in FIG. 4.

FIG. 5 shows a modified switching stage which may be used, in place of the switching stage shown to the right of the points A, B, and C in FIG. 4, where the relay coil 13 has a low resistance (e.g. 24). The switching stage shown in FIG. 5 includes an additional amplifying transistor 18 and a base current limiting resistor 19. It is considered that the operation of this switching stage will be clear from the preceding description of the operation of the switching stage shown in FIG. 4.

Figure 6:
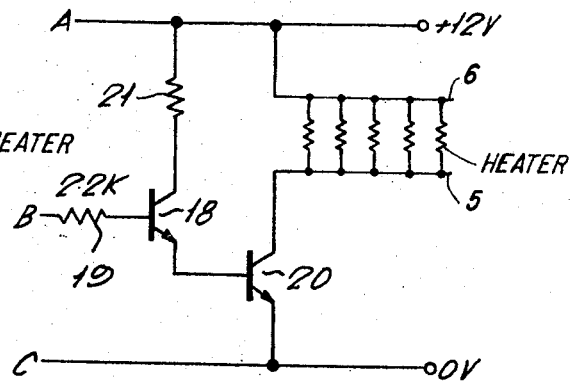

FIG. 6 shows an alternative, solid state switching stage in which the relay coil 13 and the relay contact 14 are replaced by an N P N switching transistor 20. In this circuit arrangement the heater 2 is connected directly in the collector circuit of the transistor 20 via the wires 5 and 6, and a resistive load 21 is included in the collector circuit of the current amplifying transistor 18. Again it is considered that the operation of this switching stage will be clear from the foregoing description, and that no further description is necessary.

One or more of the fixed resistances in the sensing and amplifying circuit shown in FIG. 4 could be replaced by a variable resistance, which may be adjusted to adjust the sensitivity of the circuit to the degree of condensation on the window. In this way the condensation control arrangement can be adjusted for varying conditions of humidity, etc., so that the heater will be switched on as soon as the slightest trace of condensation forms on the window, the condensation then being evaporated before it builds up to an objectionable level.

It is appreciated that many modifications, variations and equivalents of the arrangements particularly described herein are possible without departing from the spirit of this invention. Therefore, the aforegoing descriptions are to be regarded as exemplary and in no way limiting, the scope of the invention being as defined in the appended claims. Thus, for example, it may be advantageous to employ a.c. operation of the sensing electrodes rather than the d.c. operation described herein.

I claim:

1. In a road vehicle having a window, an arrangement for reducing condensation upon the interior surface of said window including: a pair of extended linear electrodes arranged to extend across said window so as to be bridged resistively by condensation upon said surface, the electrodes being spaced from one another differently at different points along their length with the spacing being least in the region of the center of the window; a heating element comprising a plurality of generally parallel electrical resistance heating elements arranged for heating said surface; and an electronic switching circuit responsive to the resistance between said electrodes for energizing the heating element for so long as the resistance between said electrodes is lower than that characterizing a predetermined degree of condensation upon said surface; the differential spacing of the electrodes providing the arrangement with a differential sensitivity to condensation on different areas of the window surface.

2. In a road vehicle, an arrangement as claimed in claim 1 wherein one of said electrodes is rectilinear, and the other of said electrodes is arcuate.

3. In a road vehicle, an arrangement as claimed in claim 2 wherein said resistance heating elements are rectilinear, and said rectilinear one of said electrodes is nearest to and extends parallel to said resistance heating elements.

4. In a road vehicle, an arrangement as claimed in claim 3 wherein said resistance heating elements are equally spaced from one another, and said rectilinear one of said electrodes lies outside of the area encompassed by the resistance heating elements and is spaced from the nearest adjacent resistance heating element by a distance of the order of half the spacing of the resistance heating elements from one another.

5. An electrically heated window for a road vehicle, said window having a plurality of generally parallel and uniformly spaced extended linear electrical resistance heating elements in heat transfer relation therewith, and furthermore having on one surface thereof a pair of extended linear electrodes extending across said window and adapted to be bridged resistively by condensation upon said surface for enabling automatic energization of the heating elements, said electrodes being arranged outside of the area encompassed by said plurality of heating elements, one of said electrodes being generally parallel to the nearest adjacent one of said plurality of heating elements and being spaced therefrom by a distance of the order of half the distance spacing the heating elements from one another, and the other of said electrodes being differently spaced from said one electrode at different points along their lengths, the spacing being least in the region of the center of the window.

6. An electrically heated window as claimed in claim 5 wherein said heating elements are rectilinear, said one electrode is rectilinear, and said other electrode is arcuate.

7. An electrically heated window for a road vehicle, said window having an electrical heating element in heat transfer relationship therewith, and furthermore having on one surface thereof a pair of elongate electrodes extending across said window and serving for sensing resistively the formation of condensation on the said surface of the window thereby to enable the automatic energization of the heating element in order to disperse the condensation, the said electrodes being spaced from one another differently in different regions of the window, the spacing being least in a central region of the window, so as to provide a differential sensitivity to the formation of condensation on different areas of the window surface.

* * * * *